United States Patent
Duch et al.

(10) Patent No.: US 10,459,000 B2
(45) Date of Patent: Oct. 29, 2019

(54) ENCODER WHEEL FOR WHEEL-HUB UNIT

(71) Applicant: Aktiebolaget SKF, Gothenburg (SE)

(72) Inventors: Daniele Duch, San Gillio (IT); Marco Gemello, Nichelino (IT)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/824,091

(22) Filed: Nov. 28, 2017

(65) Prior Publication Data
US 2018/0335442 A1    Nov. 22, 2018

(30) Foreign Application Priority Data
Nov. 28, 2016 (IT) .................. 102016000119368

(51) Int. Cl.
| | | |
|---|---|---|
| G01P 3/44 | (2006.01) | |
| B60B 27/00 | (2006.01) | |
| F16C 41/00 | (2006.01) | |
| G01P 3/487 | (2006.01) | |
| B60T 8/32 | (2006.01) | |
| F16C 33/58 | (2006.01) | |
| G01D 5/244 | (2006.01) | |
| F16C 19/18 | (2006.01) | |

(52) U.S. Cl.
CPC .......... *G01P 3/443* (2013.01); *B60B 27/0068* (2013.01); *B60T 8/329* (2013.01); *F16C 33/586* (2013.01); *F16C 41/007* (2013.01); *G01D 5/24442* (2013.01); *G01P 3/487* (2013.01); *B60B 27/001* (2013.01); *B60B 27/0078* (2013.01); *F16C 19/185* (2013.01); *F16C 2326/02* (2013.01)

(58) Field of Classification Search
CPC .... F16C 19/185; F16C 35/067; F16C 41/007; F16C 2326/02; G01D 3/443; G01D 3/487; B60B 27/001; B60B 27/0068; B60T 8/329
USPC ............... 384/445–446, 448–449, 512, 544; 340/854.4, 870.16; 324/173–175, 207.22, 324/207.25
See application file for complete search history.

(56) References Cited

U.S. PATENT DOCUMENTS

| | | | | |
|---|---|---|---|---|
| 4,667,156 A | * | 5/1987 | Machino | B60B 27/0005 324/173 |
| 4,795,278 A | * | 1/1989 | Hayashi | B60B 27/0068 310/155 |
| 4,932,245 A | * | 6/1990 | Shelton | G01P 3/443 324/173 |

(Continued)

FOREIGN PATENT DOCUMENTS

| | | | | |
|---|---|---|---|---|
| DE | 19936536 A1 | 2/2001 | | |
| GB | 1406739 A | * 9/1975 | | B60T 8/329 |

(Continued)

*Primary Examiner* — Marcus Charles
(74) *Attorney, Agent, or Firm* — Bryan Peckjian; SKF USA Inc. Patent Dept.

(57) ABSTRACT

A speed measuring device for a wheel-hub unit provided with a rolling bearing, the measuring device having an encoder wheel made of magnetized elastic material and assembled on a rotating ring of the bearing; mechanical supporting means that are directly placed between the encoder wheel and the ring so that the encoder wheel and the ring are angularly constrained to each other; and mechanical locking means for axially locking the encoder wheel inside a seat defined by the mechanical locking means together with the mechanical supporting means.

6 Claims, 2 Drawing Sheets

(56) References Cited

U.S. PATENT DOCUMENTS

| | | | | |
|---|---|---|---|---|
| 4,969,753 | A * | 11/1990 | Kato | B60B 27/0068 |
| | | | | 384/448 |
| 5,090,236 | A * | 2/1992 | Vignotto | G01P 3/443 |
| | | | | 384/448 |
| 5,132,616 | A * | 7/1992 | Vignotto | G01P 3/443 |
| | | | | 324/174 |
| 5,760,575 | A * | 6/1998 | Kumamoto | G01P 1/00 |
| | | | | 29/428 |
| 6,184,678 | B1 * | 2/2001 | Kumamoto | G01P 3/487 |
| | | | | 310/168 |
| 6,323,640 | B1 * | 11/2001 | Forestiero | F16C 33/7879 |
| | | | | 324/174 |
| 6,857,782 | B2 * | 2/2005 | Norimatsu | B60B 27/00 |
| | | | | 384/448 |
| 8,596,146 | B2 * | 12/2013 | Ono | B60B 27/0005 |
| | | | | 384/448 |
| 2003/0053726 | A1 | 3/2003 | Nakajima | |
| 2003/0059139 | A1 | 3/2003 | Nakajima | |
| 2006/0170414 | A1 | 8/2006 | Vignotto et al. | |
| 2010/0296759 | A1 * | 11/2010 | Dlugai | F16C 33/38 |
| | | | | 384/448 |
| 2017/0284460 | A1 * | 10/2017 | Sguotti | B60B 27/0005 |

FOREIGN PATENT DOCUMENTS

| | | | | |
|---|---|---|---|---|
| GB | 1462715 A * | 1/1977 | | B60T 8/329 |
| JP | 10282131 A * | 10/1998 | | |
| JP | 2005291478 A * | 10/2005 | | |
| WO | 2011135209 A2 | 11/2011 | | |

* cited by examiner

ENCODER WHEEL FOR WHEEL-HUB UNIT

CROSS-REFERENCE

This application claims priority to Italian patent application no. 102016000119368 filed on Nov. 28, 2016, the contents of which are fully incorporated herein by reference.

TECHNOLOGICAL FIELD

The present invention relates to an encoder wheel for a wheel-hub unit.

The present invention is particularly suitable, although not exclusively, in the field of motor vehicle wheel-hub units provided with a rolling bearing. These applications comprise both the case where the outer ring of the bearing is rotating, while the inner ring of the bearing is fixed, and the opposite case where the inner ring rotates and the outer ring is fixed. The encoder wheel forms part of a device for detecting the speed of rotation of the rotating ring of the bearing. These devices also comprise a sensor, normally a speed sensor, suitable for acquiring a signal generated by the encoder wheel which allows monitoring of the kinematic operating parameters of the wheel-hub unit. The description which follows will refer, by way of example, to these specific applications without thereby losing its general character.

BACKGROUND

Known speed measuring devices of the aforementioned type include an encoder wheel in the form of an annular disk or cylindrical shield of magnetized rubber which is angularly constrained to the rotating ring of the bearing. In some known solutions, the encoder wheel comprises a metallic insert which is fixed by means of gluing to the magnetized rubber portion and is force-fitted onto the rotating ring of the bearing or onto an element integral therewith. In other solutions, instead, the encoder wheel is directly mounted onto the rotating ring and is angularly constrained to the rotating ring by means of gluing.

It has been found, however, that in the case where they are glued onto the metallic insert, the encoder wheels are subject to tension which they do not withstand well, whereas in the case where they are glued directly onto the rotating ring, the encoder wheels are difficult to position.

SUMMARY

The object of the present invention is to provide an encoder wheel for a wheel-hub unit which is devoid of the drawbacks described above.

According to the present invention an encoder wheel for a wheel-hub unit provided with a rolling bearing is realized, the unit having the characteristic features indicated in the attached independent claims.

The encoder wheel thus realized is mounted on the rotating ring of the bearing and is constrained thereto by means of the arrangement, in between, of mechanical support means which, not only facilitate assembly thereof, but also, being for example devoid of any gluing, are able to eliminate practically entirely the formation of tensioned states in the magnetized rubber and allow any positional adjustments, while ensuring the stability thereof during use.

Furthermore, the possibility of eliminating gluing and therefore reducing the number of components of the speed measuring device gives rise to the additional advantages of a faster manufacturing and assembly process and a reduced environment impact.

Further, preferred and/or particularly advantageous, embodiments of the invention are described in accordance with the characteristic features indicated in the attached dependent claims.

BRIEF DESCRIPTION OF THE DRAWINGS

The invention will now be described with reference to the accompanying drawings which illustrate a non-limiting example of embodiment thereof, in which.

DETAILED DESCRIPTION

Figure 1:
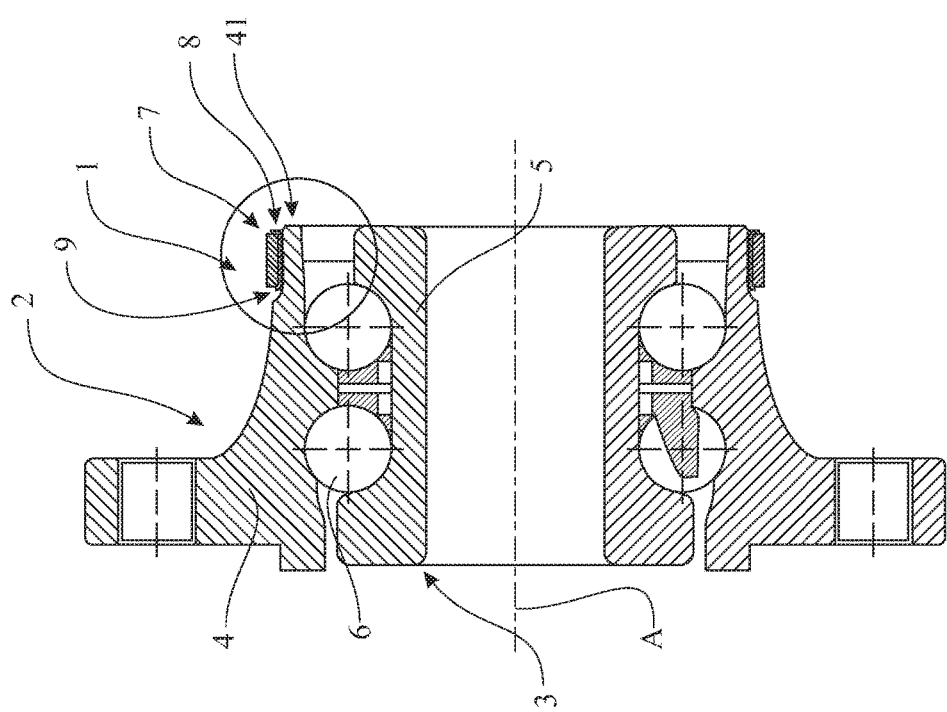
FIG. 1 is a partially sectioned view of a wheel-hub unit equipped with a speed measuring device according to the invention, with radial encoder wheel mounted on the outer ring of the bearing.

With reference to FIG. 1, 1 denotes in its entirety a speed measuring device for a wheel-hub unit 2. The unit 2 is provided with a rolling bearing 3 comprising an outer ring 4, coaxial with an axis A of rotation of the the bearing 3, an inner ring 5 coaxial with the outer ring 4 and a plurality of rolling means 6, for example balls, placed between the outer ring and inner ring. In the example proposed in FIG. 1, the outer ring 4 of the bearing 3 is rotating, while the inner ring 5 is fixed.

The bearing 3 is provided with a device 1 for measuring the speed of rotation of the outer rotating ring 4; this device 1 comprises:

a radial encoder wheel 7, mechanical supporting means 8 placed between the encoder wheel 7 and the outer ring 4 in order to support the encoder wheel 7 and angularly constrain it to the outer ring 4;

mechanical locking means 9 for axially locking the encoder wheel 7 on the mechanical supporting means 8; and a sensor (not shown), facing the encoder wheel and mounted on a fixed part of the vehicle.

Figure 2:
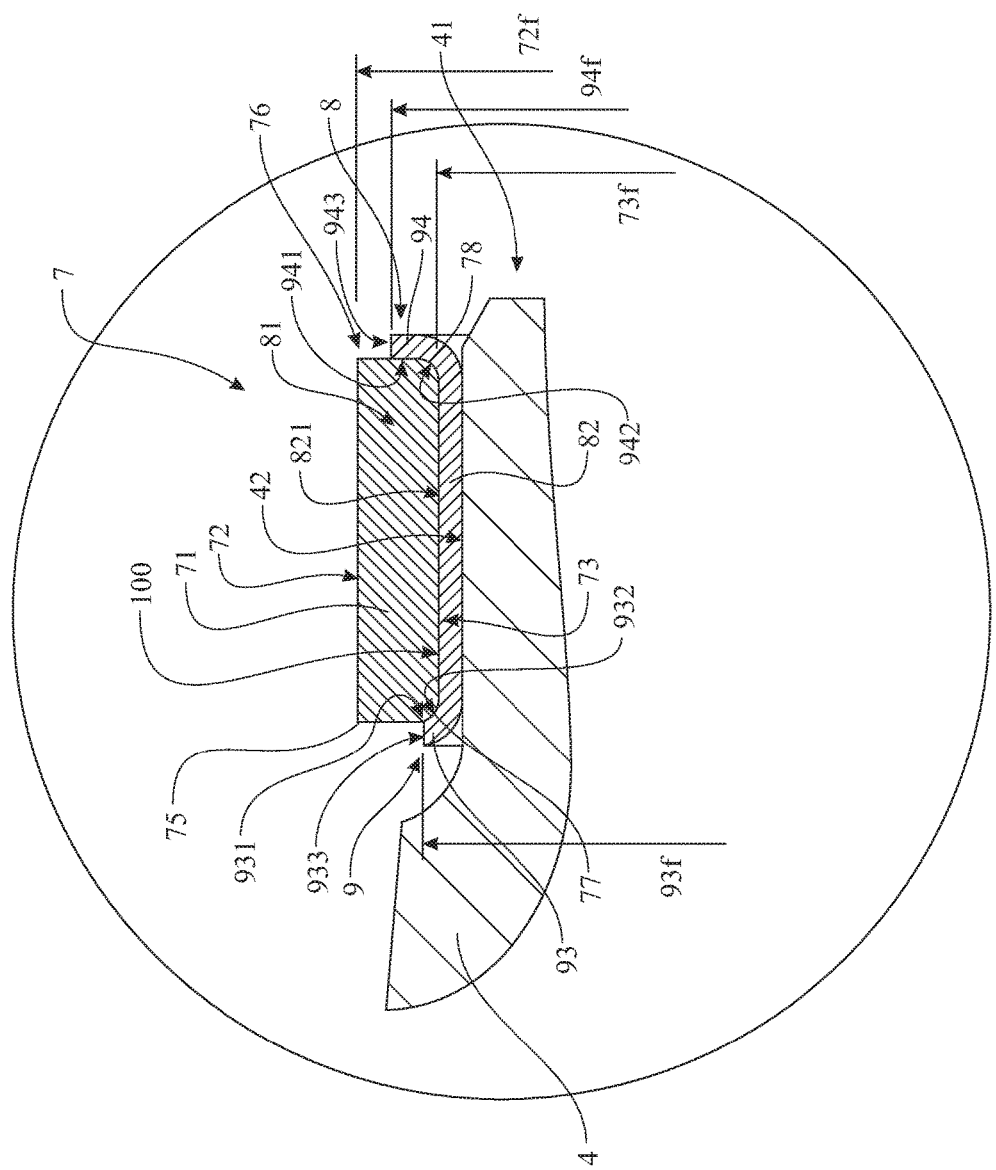
FIG. 2 is a view, on a larger scale, of the radial encoder wheel according to FIG. 1.

According also to that shown in FIG. 2, the mechanical supporting means 8 are mounted directly on the axially outer side 41 of the outer ring 4 and comprise a bottom cylindrical wall 82, which is keyed in an adjustable manner on an outer cylindrical surface 42 of the outer ring 4, is coaxial with the axis A and is radially bounded towards the outside by a cylindrical bottom surface 821.

The mechanical locking means 9 are combined with the mechanical supporting means 8 so as to lock axially the encoder wheel 7 onto the the mechanical supporting means 8 and comprise a smaller side wall or flange 93 and a bigger side wall or flange 94, the walls or flanges being integral on the opposite sides with the cylindrical bottom wall 82 and extending radially outwards from the the cylindrical bottom wall 82; the side walls or flanges 93 and 94 are mechanical means for locking the encoder wheel 7 and axially lock the the encoder wheel 7 on the cylindrical bottom wall 82. The smaller lateral wall or flange 93 is arranged axially on the opposite side to the axially outer side 41 of the outer ring 4 in relation to the bottom cylindrical wall 82 and is radially bounded towards the outside by a cylindrical surface 933 having a diameter 93$f$ with smaller dimensions than the dimensions of a diameter 94$f$ of a radially outer cylindrical surface 943 of the bigger side wall or flange 94, which is arranged on the same side as the axially outer side 41 of the outer ring 4. The side walls or flanges 93 and 94 are, moreover, axially bounded by on the side facing the cylindrical bottom wall by respective surfaces 931 and 941 which are transverse to the axis A and connected to the cylindrical bottom surface 821 by means of respective toroidal connecting portions 932 and 942.

The side walls or flanges 93 and 94 as well as the cylindrical bottom wall 82 are made of metallic material and define between them a U-shaped metallic insert 81 as well as a seat 100 for the encoder wheel 7: if both the side walls or flanges 93 and 94 prevent any axial movement of the encoder wheel 7 with respect to the cylindrical bottom wall 82, the radial height of the side walls or flanges 93 and 94 is such that the side wall or flange 93 has a different function from the side wall or flange 94. In fact, the side wall or flange 93 allows the insertion of the encoder wheel 7 inside the seat 100, while the side wall or flange 94 allows mounting of the encoder wheel 7 onto the surface 42 by means of pushing means, not shown, which apply an axial mounting force onto the the side wall or flange 94 without pressing against the encoder wheel 7 which, at least during mounting on the bearing 3, is therefore protected. The side wall or flange 94 is also able to protect the encoder wheel 7 during operation of the measuring device 1, preventing any impacts between the encoder wheel 7 and external elements and/or the bearing 3 and/or the measuring device 1.

The encoder wheel 7 comprises a cylindrical shield 71, which is made of rubber magnetized with alternate polarities in the circumferential direction and is radially bounded on the outside by a reading surface 72 and on the onside by a mounting surface 73: both the surfaces 72 and 73 are cylindrical surfaces and the reading surface 72 has a diameter 72$f$ with dimensions greater both than the dimensions of the diameter 93$f$ and the dimensions of the diameter 94$f$, while the mounting surface 73 is arranged in contact with the surface 821 and has a diameter 73$f$ with dimensions slightly smaller than the dimensions of the diameter 93$f$, but with a difference sufficient both for allowing the elasticity of the cylindrical shield 71 to expand, preferably radially, by the amount need to extend axially beyond the side wall or flange 93 during assembly, and for ensuring that the side wall or flange 93 may provide an effective axial locking action for the said encoder wheel 7.

In fact, the magnetized rubber from which the cylindrical shield 71 is made has an overall elasticity such as to allow elastic expansion of the cylindrical shield 71 during assembly of the encoder wheel 7 on the mechanical supporting means 8: this elastic expansion, which may be obtained thermally, preferably but not necessarily by heating the cylindrical shield 71, or mechanically, preferably but not necessarily by means of mechanical expansion of the cylindrical shield 71, allows the diameter 73$f$ of the mounting surface 73 to acquire a dimension bigger than the dimension of the diameter 93$f$ of the side wall or flange 93 and, therefore, allows the shield 71 to be easily inserted inside the seat 100, passing without difficulty over the side wall or flange 93. The elasticity of the magnetized rubber from which the cylindrical shield 71 is made also allows the cylindrical shield 71 to reacquire, once inserted inside the seat 100, its nominal dimensions, namely those dimensions which cause the surface to come into direct and close contact with the surface 821, creating friction conditions such that the encoder wheel 7 and wall 82 are angularly constrained to each other. The elastic return of the magnetized rubber of the cylindrical shield 71 radially closes the cylindrical shield 71 against the wall 82 and, since the wall 82 is in turn keyed onto the outer cylindrical surface 42 of the outer ring 4, namely the type of mounting of the wall 82 results in the the wall 82 and the outer ring 4 bring angularly constrained together, while allowing small adjustments in the axial direction where necessary, the encoder wheel 7 is definitively angularly constrained to the outer ring 4, all of which owing to the frictional force generated by the contact between the surfaces of encoder wheel 7 and wall 82 and between the surfaces of wall 82 and outer ring 4.

The encoder wheel 7, finally, in the region of the toroidal connecting portions 932 and 942, has respective rounded annular edges 77 and 78 such as to match the form of the the toroidal connecting portions 932 and 942 and such as to facilitate the operations of assembly of the cylindrical shield 71 inside the seat 100. The rounded annular edges 77 and 78 also prevent the formation of any splits and/or cracks within the cylindrical shield 71 and allow finally also optimum centering of the encoder wheel 7 inside the seat 100.

Lastly, it should be noted that the cylindrical shield 71 has a radial thickness S with dimensions decidedly greater than the difference between the dimensions of the diameter 93$f$ and the dimensions of the diameter 73$f$ such that mounting of the encoder wheel 7 inside the seat 100 is even more reliable, namely devoid of any defects. By way of a non-limiting example, a thickness S equal to at least 4 or 6 times the difference between the dimensions of the diameter 93$f$ and the dimensions of the diameter 73$f$ is such that mounting of the encoder wheel 7 inside the seat 100 is absolutely safe and problem-free both in the case where the cylindrical shield 71 must be expanded thermally and in the case where the cylindrical shield 71 must be expanded mechanically.

The mechanical supporting means 8 and the mechanical locking means 9 according to the present invention offer numerous technical advantages such as:

the possibility of mounting the encoder wheel 7 on the surface 42 of the outer ring 4 with adjustment of the axial position of the encoder wheel 7 also during definitive assembly of the wheel-hub unit 2 on the vehicle and with compensation of any errors in alignment of the encoder wheel 7 with respect to the the sensor;

the possibility of avoiding using glues for fixing the encoder wheel 7 to the rotating ring 4, the glues often not being environmentally sustainable and in any case requiring particular attention during the production cycle and also resulting in an increase of the assembly time; and the possibility of protecting the cylindrical shield 71 from any impacts, in particular during assembly with the bearing 3.

The greatest advantage of the mechanical locking means 9 according to the present invention consists, however, in the different dimension of the side walls or flanges 93 and 94 both with respect to each other and with respect to the encoder wheel 7. In fact, the particular smaller dimension of the side wall or flange 93 compared to a radial thickness of the cylindrical shield 71 leaves a side edge of 75 of the encoder wheel 7 almost entirely substantially exposed, allowing in the region of the the cylindrical shield 71 easier diffusion of the magnetic field generated by the magnetized rubber of the cylindrical shield 71. On the axially opposite side, the smaller dimension of the side wall or flange 94 compared to the radial thickness of the cylindrical shield 71 leaves a portion of a side edge 76 sufficiently exposed to allow, in any case, good diffusion of the magnetic field generated by the magnetized rubber and, at the same time, protect the the edge 76 during mounting of the encoder wheel 7 on the rotating outer ring 4. The greater diffusion of the magnetic field generated by the magnetized rubber of the cylindrical shield 71 both on the side facing the axially outer side 41 of the outer ring 4 and, in particular, on the side axially opposite to the axially outer side 41 means that axial mounting of the device 1 for measuring the speed of rotation of the outer rotating ring 4 may be performed even more freely, allowing easy compensation of any axial errors in mounting, either of the sensor or of the encoder wheel 7, without, however, negatively affecting the quality of the magnetic signal which can be received by the the sensor.

Furthermore, also, the particular smaller dimension of the side wall or flange 93 compared to the radial thickness of the cylindrical shield 71 allows easy mounting of the encoder wheel 7 inside the seat 100 without any damage to the the encoder wheel 7 and making use only of the typical elasticity of the magnetized rubber.

Owing to these many advantages, the process of assembling the device, in addition to being faster because of the smaller number of components, is furthermore simplified by the flexibility offered by the axial extension of the magnetic field which is not hindered in any way by the side walls or flanges 93 and 94 which, moreover, provide effective protection and ensure reliable and stable mounting of the encoder wheel 7.

In addition to the embodiment of the invention, as described above, it is to be understood that numerous further variants exist. It must also be understood that the embodiment is only an example and does not limit the subject of the invention, nor its applications, nor its possible configurations. On the contrary, although the description provided above enables the person skilled in the art to implement the present invention at least in one of its examples of configuration, it must be understood that numerous variations of the components described are feasible, without thereby departing from the scope of the invention, as defined in the accompanying claims, interpreted literally and/or in accordance with their legal equivalents.

What is claimed is:

1. A speed measuring device for a wheel-hub unit provided with a rolling bearing, the measuring device comprising:
    an encoder wheel made of magnetized material and assembled on a rotating ring of the bearing;
    mechanical supporting means that are directly placed between the encoder wheel and the rotating ring so that the encoder wheel and the ring are angularly constrained to each other; and
    mechanical locking means for axially locking the encoder wheel inside a seat that is defined by the mechanical locking means together with the mechanical supporting means, wherein
    the mechanical supporting means comprises two lateral flanges, and comprising
    a first lateral flange having a radial dimension that is smaller than a second lateral flange, the second lateral flange is a pushing lateral flange for keying a measuring device onto the rotating ring.

2. The speed measuring device according to claim 1, wherein the mechanical supporting means are directly mounted on an axially outer side of the rotating ring and comprise a cylindrical bottom wall that is keyed in an axially adjustable manner on the rotating ring.

3. The speed measuring device according to claim 2, wherein the encoder wheel is made of elastic magnetized material, and is placed directly in contact with the cylindrical bottom wall and is angularly constrained to the cylindrical bottom wall.

4. The speed measuring device according to claim 2, wherein the mechanical locking means are combined with the mechanical supporting means so as to axially lock the encoder wheel on the mechanical supporting means and comprise the two lateral flanges that are integral with the cylindrical bottom wall; the two lateral flanges and the cylindrical bottom wall being made as one piece and, of metallic material and defining between them a U-shaped insert that bounds the seat.

5. The speed measuring device according to claim 4, wherein the pushing lateral flange of the bearing shields the encoder wheel at least during mounting of the measuring device on the rotating ring.

6. The speed measuring device according to claim 5, wherein the encoder wheel comprises a cylindrical shield that is made of rubber magnetized with circumferentially alternate polarities and has inner radial dimensions that are smaller than outer radial dimensions of the two the lateral flange.

* * * * *